(12) United States Patent
Boek et al.

(10) Patent No.: US 10,202,303 B2
(45) Date of Patent: Feb. 12, 2019

(54) COMPRESSIVELY STRESSED LAMINATED GLASS ARTICLE VIA PHOTOSENSITIVE GLASS AND METHOD OF MAKING THE ARTICLE

(71) Applicants: CORNING INCORPORATED, Corning, NY (US); Heather Debra Boek, Corning, NY (US); Nicholas Francis Borrelli, Elmira, NY (US)

(72) Inventors: Heather Debra Boek, Corning, NY (US); Nicholas Francis Borrelli, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 414 days.

(21) Appl. No.: 14/432,560

(22) PCT Filed: Oct. 4, 2013

(86) PCT No.: PCT/US2013/063408
§ 371 (c)(1),
(2) Date: Mar. 31, 2015

(87) PCT Pub. No.: WO2014/055840
PCT Pub. Date: Apr. 10, 2014

(65) Prior Publication Data
US 2015/0291468 A1    Oct. 15, 2015

Related U.S. Application Data

(60) Provisional application No. 61/744,854, filed on Oct. 4, 2012.

(51) Int. Cl.
*B32B 17/06* (2006.01)
*C03C 10/00* (2006.01)
(Continued)

(52) U.S. Cl.
CPC .......... *C03C 10/0009* (2013.01); *B32B 17/06* (2013.01); *C03B 17/02* (2013.01);
(Continued)

(58) Field of Classification Search
USPC ................. 428/426, 432, 434, 428
See application file for complete search history.

(56) References Cited

U.S. PATENT DOCUMENTS 3,282,770 A    11/1966  Stookey
3,498,775 A     3/1970  Simmons
(Continued)

FOREIGN PATENT DOCUMENTS

GB    1380781    1/1975
GB    1509644    5/1978
(Continued)

OTHER PUBLICATIONS

Chinese Office Action, dated Apr. 5, 2016, pp. 1-10, Chinese Patent Application No. 201380061566.9, The State Intellectual Property Office of The People's Republic of China.
(Continued)

*Primary Examiner* — Lauren R Colgan

(57) ABSTRACT

Laminated articles comprised of glass core and clad layers, more specifically, to compressively stressed laminated articles comprising a glass core sandwiched between first and second clad layers, the clad layers being formed from photosensitive glass.

15 Claims, 1 Drawing Sheet

(51) Int. Cl.
  *C03C 3/095* (2006.01)
  *C03C 4/04* (2006.01)
  *C03C 21/00* (2006.01)
  *C03B 17/06* (2006.01)
  *C03B 17/02* (2006.01)

(52) U.S. Cl.
  CPC ............ *C03B 17/064* (2013.01); *C03C 3/095* (2013.01); *C03C 4/04* (2013.01); *C03C 10/00* (2013.01); *C03C 10/0027* (2013.01); *C03C 21/002* (2013.01)

(56) References Cited

U.S. PATENT DOCUMENTS

| | | | |
|---|---|---|---|
| 3,597,305 A | 8/1971 | Giffen | |
| 3,633,193 A | 1/1972 | Milo | |
| 3,637,453 A | 1/1972 | Simmons | |
| 3,673,049 A | 6/1972 | Giffen et al. | |
| 3,737,294 A | 6/1973 | Dumbaugh, Jr. et al. | |
| 3,746,526 A | 7/1973 | Giffon | |
| 3,849,097 A | 11/1974 | Giffen et al. | |
| 3,854,919 A | 12/1974 | Pirooz | |
| 3,931,438 A * | 1/1976 | Beall .................. C03B 17/02 156/84 | |
| 4,093,468 A | 6/1978 | Boitel et al. | |
| 4,102,664 A | 7/1978 | Dumbaugh, Jr. | |
| 4,130,680 A | 12/1978 | Ference et al. | |
| 4,148,661 A | 4/1979 | Kerko et al. | |
| 4,212,678 A | 7/1980 | Chyung et al. | |
| 4,214,886 A | 7/1980 | Shay et al. | |
| 4,405,672 A | 9/1983 | Araujo et al. | |
| 4,455,160 A | 6/1984 | Rittler | |
| 4,480,044 A | 10/1984 | McAlinn | |
| 4,486,213 A | 12/1984 | Lentz et al. | |
| 4,726,981 A | 2/1988 | Pierson et al. | |
| 5,212,122 A | 5/1993 | Pannhorst et al. | |
| 5,342,426 A | 8/1994 | Dumbaugh, Jr. | |
| 5,411,563 A | 5/1995 | Yeh et al. | |
| 5,422,318 A | 6/1995 | Hagg et al. | |
| 5,559,060 A | 9/1996 | Dumbaugh, Jr. et al. | |
| 5,691,256 A | 11/1997 | Taguchi et al. | |
| 5,723,945 A | 3/1998 | Schermerhorn | |
| 6,515,263 B2 | 2/2003 | Mitra et al. | |
| 6,677,046 B2 | 1/2004 | Hachitani et al. | |
| 7,201,965 B2 | 4/2007 | Gulati et al. | |
| 7,382,541 B2 | 6/2008 | Inoue et al. | |
| 7,465,686 B2 | 12/2008 | Comte | |
| 7,479,949 B2 | 1/2009 | Jobs et al. | |
| 7,514,149 B2 | 4/2009 | Bocko et al. | |
| 7,635,521 B2 | 12/2009 | Aitken et al. | |
| 7,829,489 B2 | 11/2010 | Borrelli et al. | |
| 8,007,913 B2 | 8/2011 | Coppola et al. | |
| 9,522,836 B2 | 12/2016 | Gulati et al. | |
| 2001/0051583 A1 | 12/2001 | Nagata et al. | |
| 2004/0197575 A1 | 10/2004 | Bock et al. | |
| 2006/0127679 A1 | 6/2006 | Gulati et al. | |
| 2007/0149379 A1 | 6/2007 | Hsu et al. | |
| 2008/0062148 A1 | 3/2008 | Hotelling et al. | |
| 2008/0143690 A1 | 6/2008 | Jang et al. | |
| 2009/0142568 A1 | 6/2009 | Dejneka et al. | |
| 2010/0304948 A1 | 12/2010 | Comte et al. | |
| 2011/0217657 A1 | 9/2011 | Flemming et al. | |
| 2012/0135848 A1* | 5/2012 | Beall .................. C03C 10/0027 501/32 | |

FOREIGN PATENT DOCUMENTS

| | | |
|---|---|---|
| GB | 2315266 | 1/1998 |
| JP | 62246840 A | 10/1987 |
| JP | 63151647 A | 6/1988 |
| JP | 336781 A | 2/1991 |
| JP | 346308 A | 2/1991 |
| JP | 32422348 A | 10/1991 |
| JP | 05009039 A | 1/1993 |
| JP | 2000/178036 | 6/2000 |
| JP | 2002321940 A | 11/2002 |
| JP | 2009114005 A | 5/2009 |
| WO | WO 2007/146785 | 12/2007 |
| WO | WO2008/150355 | 12/2008 |
| WO | 2012005941 A1 | 1/2012 |
| WO | WO2013/130718 | 9/2013 |
| WO | 2013155281 A1 | 10/2013 |

OTHER PUBLICATIONS

English Translation of CN201380061566.9 Second Office Action dated Jan. 22, 2017, China Patent Office, 12 pgs.
English Translation of CN201380061566.9 Third Office Action dated Sep. 19, 2017, China Patent Office, 11 pgs.
International Search Report and Written Opinion, dated Apr. 15, 2014, pp. 1-15, International Application No. PCT/US2013/063408, European Patent Office, The Netherlands.
English Translation of Japanese Patent Application No. 2015535816 Office Action dated Jun. 20, 2017; 5 pages; Japanese Patent Office.
English Translation of Japanese Patent Application No. 2015535816 Office Action dated Nov. 7, 2018; pp. 1-5; Japanese Patent Office.

* cited by examiner

COMPRESSIVELY STRESSED LAMINATED GLASS ARTICLE VIA PHOTOSENSITIVE GLASS AND METHOD OF MAKING THE ARTICLE

This application claims the benefit of priority under 35 U.S.C. § 371 of International Application Number PCT/US2013/063408, filed on Oct. 4, 2013, which claims the benefit of priority under 35 U.S.C. § 119 of U.S. Provisional Application Ser. No. 61/744,854, filed on Oct. 4, 2012, the content of each of which is relied upon and incorporated herein by reference in its entirety.

BACKGROUND

Field

The present specification generally relates to articles comprised of glass core and clad layers, more specifically, to laminated articles comprising a glass core sandwiched between first and second glass clad layers, the clad layers being formed from photosensitive glass.

Technical Background

Glass articles, such as cover glasses, glass backplanes and the like, are employed in both consumer and commercial electronic devices such as LCD and LED displays, computer monitors, automated teller machines (ATMs) and the like. Some of these glass articles may include "touch" functionality which necessitates that the glass article be contacted by various objects including a user's fingers and/or stylus devices and, as such, the glass must be sufficiently robust to endure regular contact without damage. Moreover, such glass articles may also be incorporated in portable electronic devices, such as mobile telephones, personal media players, and tablet computers. The glass articles incorporated in these devices may be susceptible to damage during transport and/or use of the associated device. Accordingly, glass articles used in electronic devices may require enhanced strength to be able to withstand not only routine "touch" contact from actual use, but also incidental contact and impacts which may occur when the device is being transported.

SUMMARY

According to the present disclosure, a method for forming a laminated glass article from a glass core layer and directly adjacent glass clad layers formed from one or more photosensitive glass compositions.

In some embodiments, a method is disclosed comprising forming, with the fusion lamination process, a laminate glass sheet having at least one cladding layer formed from a photosensitive glass composition which is adjacent to a core layer formed from a glass composition, which in some embodiments, is not a photosensitive glass composition. After fusion draw of the laminate structure comprised of the core and cladding layers, the laminate structure is then exposed to UV light, sufficient to cause nucleation within the photosensitive composition, thereby growing a secondary crystal phase within that cladding layer which results in compressively stressing the clad layer, and strengthening the laminated glass structure.

In another set of embodiments, a laminated glass article formed from the above method is also disclosed herein. In some embodiments, the core glass has a first surface and a second surface opposite the first surface, where the first glass cladding layer is fused to the first surface of the glass core layer and a second glass cladding layer is fused to the second surface of the glass core layer. In other embodiments, a first diffusive glass layer is disposed between the glass core layer and the first glass cladding layer; additionally a second diffusive glass layer is disposed between the glass core layer and the second glass cladding layer; these diffusive layers is formed during, for example, the fusion forming process, or in one or more post-fusion UV light treatment steps.

Additional features and advantages of the glass compositions and glass articles formed from the glass compositions will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
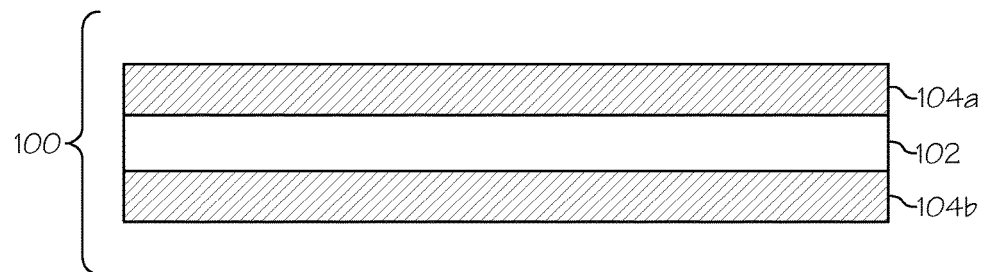
FIG. 1 schematically depicts a cross section of a laminated glass article according to one or more embodiments shown and described herein.

Reference will now be made in detail to embodiments of glass-ceramic compositions disclosed herein and articles incorporating the same, examples of which are illustrated in the accompanying drawings. Whenever possible, the same reference numerals will be used throughout the drawings to refer to the same or like parts.

The term "liquidus viscosity," as used herein, refers to the shear viscosity of the glass composition at its liquidus temperature.

The term "liquidus temperatures," as used herein, refers to the highest temperature at which devitrification occurs in the glass composition The term "CTE," as used herein, refers to the coefficient of thermal expansion of the glass composition averaged over a temperature range from about 20° C. to about 300° C.

The term "substantially free," when used to described the absence of a particular oxide component in a glass composition, means that the component is present in the glass composition as a contaminant in a trace amount of less than 1 mol. %.

In the embodiments of the glass compositions described herein, the concentration of constituent components (e.g., $SiO_2$, $Al_2O_3$, $Na_2O$ and the like) are given in mole percent (mol. %) on an oxide basis, unless otherwise specified.

The glass compositions described herein may optionally include one or more fining agents. The fining agents may include, for example, $SnO_2$, $As_2O_3$, $Sb_2O_3$ and combinations thereof. The fining agents may be present in the glass compositions in an amount greater than or equal to about 0 mol. % and less than or equal to about 0.5 mol. %. In exemplary embodiments, the fining agent is $SnO_2$. In these embodiments, $SnO_2$ may be present in the glass composition in a concentration which is greater than about 0 mol. % and less than or equal to about 0.2 mol. % or even less than or equal to about 0.15 mol. %.

In some embodiments described herein, the glass compositions may further comprise trace amounts of other oxides.

In some embodiments described herein, the glass compositions are substantially free of heavy metals and compounds containing heavy metals. Glass compositions which are substantially free from heavy metals and compounds containing heavy metals may also be referred to as "Super-Green" glass compositions. The term "heavy metals," as used herein, refers to Ba, As, Sb, Cd, and Pb.

The glass compositions disclosed herein have a liquidus viscosity which renders them suitable for use in a fusion draw process and, in particular, for use as a glass cladding composition or a glass core composition in a fusion laminate process.

Referring now to FIG. 1, the glass compositions described herein may be used to form an article, such as the laminated glass article 100 schematically depicted in cross section in FIG. 1. The laminated glass article 100 generally comprises a glass core layer 102 and a pair of glass cladding layers 104a, 104b. The glass compositions described herein are particularly well suited for use as the glass claddings layers, as will be discussed in more detail herein.

FIG. 1 illustrates the glass core layer 102 shown comprising a first surface 103a and a second surface 103b which is opposed to the first surface 103a. A first glass cladding layer 104a is fused directly to the first surface 103a of the glass core layer 102 and a second glass cladding layer 104b is fused directly to the second surface 103b of the glass core layer 102. Post-ceramming, the glass cladding layers 104a, 104b are fused to the glass core layer 102 without any additional materials, such as adhesives, polymer layers, coating layers or the like, being disposed between the glass core layer 102 and the glass cladding layers 104a, 104b. Thus, a first surface of the glass core layer is directly adjacent the first glass cladding layer, and a second surface of the glass core layer is directly adjacent the second glass cladding layer. In some embodiments, the glass core layer 102 and the glass cladding layers 104a, 104b are formed via a fusion lamination process. Diffusive layers (not shown) may form between the glass core layer 102 and the glass cladding layer 104a, or between the glass core layer 102 and the glass cladding layer 104b, or both.

In at least some of the embodiments of the laminated glass article 100 described herein, the glass cladding layers 104a, 104b are formed from a first glass-ceramic composition having an average cladding coefficient of thermal expansion $CTE_{clad}$ and the glass core layer 102 is formed from a second, different glass composition which has an average coefficient of thermal expansion $CTE_{core}$.

Figure 2:
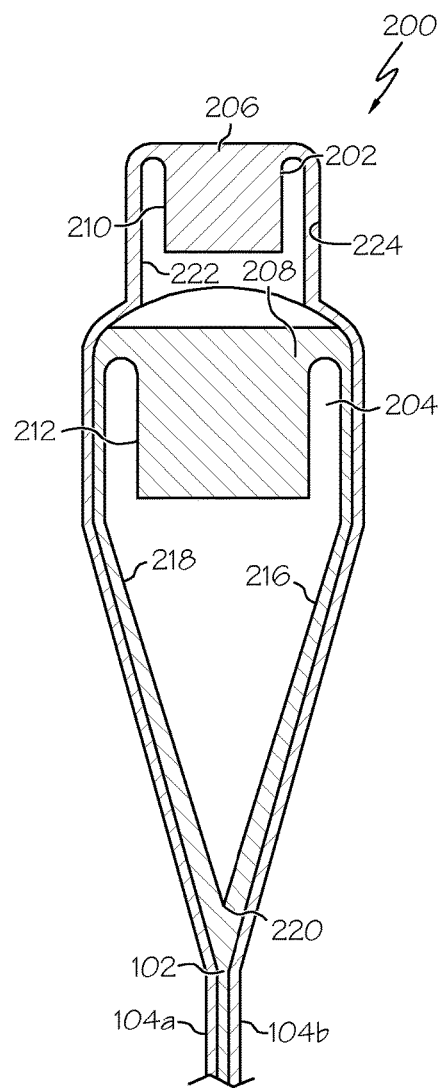
FIG. 2 schematically depicts a fusion draw process for making the glass article of FIG. 1.

Specifically, the glass articles 100 described herein may be formed by a fusion lamination process such as the process described in U.S. Pat. No. 4,214,886, which is incorporated herein by reference. Referring to FIG. 2 by way of example, a laminate fusion draw apparatus 200 for forming a laminated glass article includes an upper isopipe 202 which is positioned over a lower isopipe 204. The upper isopipe 202 includes a trough 210 into which a molten glass cladding composition 206 is fed from a melter (not shown). Similarly, the lower isopipe 204 includes a trough 212 into which a molten glass core composition 208 is fed from a melter (not shown). In the embodiments described herein, the molten glass core composition 208 has an appropriately high liquidus viscosity to be run over the lower isopipe 204.

As the molten glass core composition 208 fills the trough 212, it overflows the trough 212 and flows over the outer forming surfaces 216, 218 of the lower isopipe 204. The outer forming surfaces 216, 218 of the lower isopipe 204 converge at a root 220. Accordingly, the molten glass core composition 208 flowing over the outer forming surfaces 216, 218 rejoins at the root 220 of the lower isopipe 204 thereby forming a glass core layer 102 of a laminated glass structure.

Simultaneously, the molten glass-ceramic cladding compositions 206 overflows the trough 210 formed in the upper isopipe 202 and flows over outer forming surfaces 222, 224 of the upper isopipe 202. The molten glass-ceramic cladding composition 206 has a lower liquidus viscosity requirement to be run on the upper isopipe 202, and will have a CTE either equal to or less than the glass core composition 208 (for example, within about 5×10−7) when present as a glass. The molten glass-ceramic cladding composition 206 is outwardly deflected by the upper isopipe 202 such that the molten glass cladding composition 206 flows around the lower isopipe 204 and contacts the molten glass core composition 208 flowing over the outer forming surfaces 216, 218 of the lower isopipe, fusing to the molten glass core composition and forming pre-cerammed glass cladding layers 104a, 104b around the glass core layer 102.

In some embodiments, in the laminated sheet so formed, the clad thickness will also be significantly thinner than the core glass thickness so that the clad goes into compression and the core into tension. But as the CTE difference is low, the magnitude of the tensile stress in the core will be very low (e.g on the order of 10 MPa or lower) which will allow for the production of a laminated sheet that will be relatively easy to cut off the draw due to its low levels of core tension. Sheets can thus be cut from the laminate structure or laminated article that is drawn from the fusion draw apparatus, and after the sheets are cut, the cut product can then be subjected to a suitable UV light treatment(s), such as to form a final laminated article.

In some embodiments, the liquidus viscosity of the photosensitive glass is about 200 kP or below; in some of these embodiments, the photosensitive glass is a high alkali (largely Li) aluminosilicate glass. The liquidus viscosity can be changed with glass components, such as changing the ratio of alumina to alkalis or the blend of alkalis; additionally, the photosensitivity sensitivity can be changed, for example per method used.

For example, in some embodiments the glass is exposed to UV light which results in nucleation by Ag and, upon heat treatment, lithium silicate crystals are grown such as lithium metasilicate (Li2SiO3) and/or lithium disilicate (Li2Si2O5). In some embodiments, the CTE of the as-made glass is in the range of 70-80×10−7 C. Subjecting this glass to a second and higher temperature, some re-crystallization occurs to form ß-spodumene, resulting in a lowered CTE, to about 60×10−7 C. In embodiments where Li2Si2O5 persists plus silica (low-T tridymite), the CTE is higher, for example up to about 100×10−7 C. The CTE of the as-made glass can match that of the inner (core) glass while being formed, but then can be changed to form a compressive (clad) layer upon photosensitive-driven crystallization.

Exemplary photosensitive glasses are provided in Table 1.

TABLE 1

| Composition (mole %) | 13 | 14 | 15 | 16 | 17 | 18 | 19 | 20 | 21 | 22 | 23 |
|---|---|---|---|---|---|---|---|---|---|---|---|
| $SiO_2$ | 73.5 | 76.7 | 74.9 | 74.7 | 73.6 | 73.8 | 74.8 | 72.7 | 72.1 | 71.4 | 70.8 |
| $Al_2O_3$ | 5.0 | 2.8 | 3.7 | 4.5 | 4.9 | 4.9 | 5.1 | 4.9 | 4.8 | 4.8 | 4.8 |
| $Li_2O$ | 17.7 | 14.6 | 13.2 | 13.2 | 12.7 | 12.0 | 16.5 | 14.1 | 15.9 | 17.6 | 19.2 |
| $Na_2O$ | 1.1 | 1.4 | 1.6 | 1.6 | 2.6 | 2.6 | 1.0 | 2.3 | 2.1 | 1.8 | 1.5 |
| $K_2O$ | 1.4 | 4.1 | 4.3 | 3.9 | 3.2 | 3.8 | 1.3 | 3.5 | 3.0 | 2.5 | 2.1 |
| BaO | 0 | 0 | 1.2 | 1.2 | 2.5 | 2.5 | 0 | 2.0 | 1.4 | 0.9 | 0.5 |
| ZnO | 1.2 | 0.3 | 0.9 | 0.7 | 0.2 | 0.2 | 1.2 | 0.4 | 0.6 | 0.8 | 1.0 |
| $CeO_2$ | 0.003 | 0.003 | 0.006 | 0.004 | 0.005 | 0.005 | 0.004 | 0.005 | 0.005 | 0.005 | 0.004 |
| $SnO_2$ | 0 | 0.012 | 0.012 | 0.012 | 0.012 | 0.012 | 0 | 0.001 | 0.001 | 0.004 | 0.0002 |
| $Sb_2O_3$ | 0.04 | 0.090 | 0.120 | 0.109 | 0.106 | 0.107 | 0.040 | 0.092 | 0.079 | 0.067 | 0.055 |
| Ag | 0.050 | 0.048 | 0.049 | 0.049 | 0.049 | 0.044 | 0.043 | 0.056 | 0.050 | 0.049 | 0.043 |
| Au | 0.00003 | 0.0003 | 0.0003 | 0.0003 | 0.0003 | 0.0003 | 0.0003 | 0.0003 | 0.0003 | 0.0003 | 0.0003 |
| 0-300° C. CTE | 75 | 80.9 | 80.2 | 77.1 | 80.0 | 81.3 | 68.4 | 80.4 | 80.1 | 80.1 | 79.9 |
| 24 hour Liquidus (° C.) | 940 | 880 | 850 | 860 | 840 | 840 | 950 | 855 | 870 | 885 | 890 |
| Liquidus Viscosity (kP) | 20 | 71 | 123 | 119 | 220 | 140 | 38 | 99 | 56 | 34 | 25 |

The exemplary glasses in Table 1 are also candidates for ion-exchange, even if they are not used as photosensitive material because of the high Li content. The Li can be exchanged with a Na- or K-rich inner glass to form a strengthened laminate. Such alkali migration could also occur during the draw. Thus, in some embodiments disclosed herein, a laminated glass article comprises a glass core layer and one or more directly adjacent glass clad layers formed from one or more photosensitive or ion-exchangeable glass compositions. The clad layer can then be processed to comprise photosensitized, or ion-exchanged, clad compositions, resulting in a strengthened laminate article.

In some embodiments, the clad layer comprises from about 70.0 mol. % to about 77.0 mol. % SiO2; from about 2.5 mol. % to about 5.0 mol. % Al2O3; from about 12.0 mol. % to about 18.0 mol. % Li2O. In some of these embodiments, the clad layer further comprises from about 1.0 mol. % to about 3.0 mol. % Na2O. In some of these embodiments, the clad layer further comprises from about 1.0 mol. % to about 5.0 mol. % K2O. In some of these embodiments, the clad layer further comprises from about 0 mol. % to about 2.5 mol. % BaO. In some of these embodiments, the clad layer further comprises from about 0.1 mol. % to about 1.3 mol. % K2O.

The laminated articles disclosed herein may be employed in a variety of consumer electronic devices including, without limitation, mobile telephones, personal music players, tablet computers, LCD and LED displays, automated teller machines and the like.

In some embodiments, the laminated article may comprise one or more layers which are opaque, transparent or translucent, such as a clad derived from a glass composition wherein the clad layer is opaque, transparent or translucent after heat treatment(s). Furthermore, the use of glass in sheet form can be utilized.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A laminated article comprising:
    a glass core layer disposed between a first glass cladding layer and a second glass cladding layer;
    wherein the glass core layer has a composition which is different from the composition of the first and second glass cladding layers; and
    wherein at least one of the first glass cladding layer or the second glass cladding layer comprises from about 70.0 mol. % to about 77.0 mol. % $SiO_2$; from about 2.5 mol. % to about 5.0 mol. % $Al_2O_3$; and from about 12.0 mol. % to about 18.0 mol. % $Li_2O$.

2. The laminated article of claim 1 wherein at least one of the first glass cladding layer or the second glass cladding layer further comprises from about 1.0 mol. % to about 3.0 mol. % $Na_2O$.

3. The laminated article of claim 1 wherein at least one of the first glass cladding layer or the second glass cladding layer further comprises from about 1.0 mol. % to about 5.0 mol. % $K_2O$.

4. The laminated article of claim 1 wherein at least one of the first glass cladding layer or the second glass cladding layer further comprises from about 0 mol. % to about 2.5 mol. % BaO.

5. The laminated article of claim 1 wherein at least one of the first glass cladding layer or the second glass cladding layer further comprises from about 0.1 mol. % to about 1.3 mol. % $K_2O$.

6. The laminated article of claim 1 wherein at least one of the first glass cladding layer or the second glass cladding layer comprises beta-spodumene.

7. The laminated article of claim 1, wherein the composition of the core layer is a non-photosensitive glass composition.

8. The laminated article of claim 1, wherein at least one of the first glass cladding layer or the second glass cladding layer comprises lithium silicate crystals.

9. The laminated article of claim 8, wherein the lithium silicate crystals are lithium metasilicate ($Li_2SiO_3$), lithium disilicate ($Li_2Si_2O_5$), or a combination thereof.

10. The laminated article of claim 1, wherein at least one of the first glass cladding layer or the second glass cladding layer comprises a coefficient of thermal expansion of about $70 \times 10^{-7}/°$ C. to about $80 \times 10^{-7}/°$ C.

11. The laminated article of claim 10, wherein the coefficient of thermal expansion of the at least one of the first glass cladding layer or the second glass cladding layer is within about $5\times10^{-7}/°$ C. of a coefficient of thermal expansion of the glass core layer.

12. The laminated article of claim 1, wherein at least one of the first glass cladding layer or the second glass cladding layer comprises a liquidus viscosity of about 20 kP to about 220 kP.

13. The laminated article of claim 1, wherein the glass core layer comprises $K_2O$ in a higher concentration than the at least one of the first glass cladding layer or the second glass cladding layer.

14. The laminated article of claim 1, wherein Li in at least one of the first glass cladding layer or the second glass cladding layer has been exchanged with at least one of Na or K in the glass core layer.

15. A use of the laminated article of claim 1 for cover glass or glass backplane applications in consumer or commercial electronic devices, for touch screen or touch sensor applications, for portable electronic devices, for photovoltaic applications, for architectural glass applications, for automotive or vehicular glass applications, or for commercial or household appliance applications.

* * * * *

UNITED STATES PATENT AND TRADEMARK OFFICE
CERTIFICATE OF CORRECTION

PATENT NO. : 10,202,303 B2
APPLICATION NO. : 14/432560
DATED : February 19, 2019
INVENTOR(S) : Heather Debra Boek et al.

It is certified that error appears in the above-identified patent and that said Letters Patent is hereby corrected as shown below:

On the Title Page

Page 2, Column 2, item [56], Line 7, delete "Bock et al." and insert -- Bocko et al. --, therefor.

Signed and Sealed this
Tenth Day of December, 2019

Andrei Iancu
*Director of the United States Patent and Trademark Office*